(12) United States Patent
Laronge et al.

(10) Patent No.: US 6,745,179 B2
(45) Date of Patent: Jun. 1, 2004

(54) METHOD AND SYSTEM FOR FACILITATING VIEWER NAVIGATION THROUGH ONLINE INFORMATION RELATING TO CHEMICAL PRODUCTS

(75) Inventors: Joshua N. Laronge, Marlborough, MA (US); Rajan Narayanan, Toronto (CA); David P. Planchet, Harvard, MA (US)

(73) Assignee: Shipley Company, L.L.C., Marlborough, MA (US)

( * ) Notice: Subject to any disclaimer, the term of this patent is extended or adjusted under 35 U.S.C. 154(b) by 0 days.

(21) Appl. No.: 09/975,867

(22) Filed: Oct. 12, 2001

(65) Prior Publication Data

US 2003/0071841 A1 Apr. 17, 2003

(51) Int. Cl.⁷ .............................. G06F 17/30; G06F 7/00
(52) U.S. Cl. .............................. 707/3; 345/700; 707/10; 705/26
(58) Field of Search ................................. 345/700, 739, 345/764; 705/26, 39, 40; 707/1, 3, 10, 102, 104.1

(56) References Cited

U.S. PATENT DOCUMENTS

| | | | |
|---|---|---|---|
| 5,574,844 A | 11/1996 | Mohanty et al. | 345/803 |
| 5,710,887 A | 1/1998 | Chelliah et al. | 707/26 |
| 5,740,425 A * | 4/1998 | Povilus | 707/100 |
| 5,826,270 A * | 10/1998 | Rutkowski et al. | 707/10 |
| 5,970,475 A | 10/1999 | Barnes et al. | 705/27 |
| 6,038,596 A | 3/2000 | Baldwin et al. | 709/219 |
| 6,128,600 A * | 10/2000 | Imamura et al. | 705/27 |
| 6,141,006 A * | 10/2000 | Knowlton et al. | 705/26 |
| 6,249,773 B1 | 6/2001 | Allard et al. | 705/26 |
| 6,405,176 B1 | 6/2002 | Toohey | 705/26 |
| 6,415,265 B1 | 7/2002 | Shell et al. | 705/26 |
| 6,446,076 B1 | 9/2002 | Burkey et al. | 707/102 |

OTHER PUBLICATIONS

Krichilsky et al. "System and Method for Marketing Products", Pub. No.: US 2002/0156770, Oct. 24, 2002, p. 5, paragraph 50.*

Copy of International Search Report of corresponding PCT Application Ser. No. PCT/US02/32697.

* cited by examiner

*Primary Examiner*—Greta Robinson
*Assistant Examiner*—Susan Rayyan
(74) *Attorney, Agent, or Firm*—Anne Davis Barry; S. Matthew Cairns

(57) ABSTRACT

A system for facilitating viewer navigation through online information relating to chemical products is provided. The system includes a server in communication with at least one database; a link to an order fulfillment system; a link to a payment processing system; and a rink to a client system. The system is executing web server and application server software; a commerce tool for ordering one or more chemical products; database management and security tools; and a navigation tool. The navigation tool includes a user interface displaying objects relating to the chemical products in a form of a periodic table. Each objects is linked to information or services concerning the chemical products and each object is represented as an abbreviation of a function provided by the navigation tool.

20 Claims, 5 Drawing Sheets

METHOD AND SYSTEM FOR FACILITATING VIEWER NAVIGATION THROUGH ONLINE INFORMATION RELATING TO CHEMICAL PRODUCTS

BACKGROUND

This invention relates generally to graphical user interfaces and navigation tools, and more particularly, the present invention relates to a method and system for facilitating viewer navigation through online information relating to chemical products via a navigation tool and user interface displaying a simulated representation of a periodic table of elements.

Application programs, such as database, word processing, and spreadsheet programs, perform specified tasks and solve identified problems. Historically, these programs were controlled by operating systems such as Disc Operating System (DOS) supplied by Microsoft(™). A user interacted with these computers by typing predetermined commands into an input device and accessed information within the computer system (i.e., navigated through the system) by typing commands which instructed the computer to run software programs, change directories and view directories.

In an attempt to make computer use more intuitive, graphical user interface (GUI) operating systems including personal computer navigation systems were developed such as Microsoft Windows (™). These GUI systems use navigation systems which include iconic representations of files and programs. These programs also include representations of virtual file systems to metaphorically represent files which are stored in the computer. For example, file icons representing documents and file folders representing file storage locations were created to make word processing functions easier to learn. The user interface allowed access to these documents and storage locations through the use of a point and click device such as a mouse.

Other application programs which run on personal computers use physical representations of objects to allow a user to navigate among the objects. For example, a metaphor of a door allows a user to enter a room containing objects. Once within a room, the objects may be viewed more closely by focusing attention on the object. In these programs, the physical representations represent the logical movement of the user within the program. Popular programs utilizing this technology include adventure games and educational tools. Using metaphorical icons and graphical images has been shown to enable users to intuitively navigate and control operation of the computer as well as external systems.

With current advances in technology, coupled with a growing global Internet economy, many businesses are finding new ways to facilitate online business transactions for their customers in order to encourage and increase online sales. A customer who has trouble navigating through a business' web site looking for information may easily become frustrated and go elsewhere. Unlike the online experience, a salesperson may be available to assist the customer in the physical retail environment. A business conducting sales over the Internet needs to provide easy access to product information and resources if it wants to stay competitive.

One recent navigation tool sought to simplify the customer's online shopping experience by providing a virtual reality mall user interface that included real life images of a retail environment in the form of a shopping mall whereby a customer could select a store within the mall and the user interface would retrieve products and information relating to that store. The user could browse and search for products and order them online. Some GUIs even offer three-dimensional images/icons for a more realistic view of the subject.

Businesses that provide specialized or specific services or products may particularly benefit from a graphical user interface that provides a customer with images and icons that are associated with the products and services they are interested in. By associating an image or icon with a product or service offered via a vendor's web site, customers are more likely to become favorably habituated to these images, resulting in strengthened, long-term business relationships and customer loyalties.

BRIEF SUMMARY

An exemplary embodiment of the invention relates to a method and system for facilitating viewer navigation through online information utilizing a metaphorical representation of a periodic table of elements. The system comprises a server in communication with at least one database; a link to an order fulfilment system; a link to a payment processing system; and a link to a client system. The system is executing software including web server and application server software; a commerce tool; and database management and security tools. The system is also executing a navigation tool that includes a user interface displaying objects metaphorically simulating a periodic table of elements. The objects are linked to functions provided by the navigation tool. The invention also includes a method for navigating within a graphical user interface of a computer system over a network. The method comprises providing a metaphorical representation of a periodic table of elements on a display device of the computer system, linking each of the elements to an item stored in a database and, upon selecting one of said elements, retrieving the item from storage and displaying it on the display device. The metaphorical representation includes arranging each of the elements in an asymmetric tabular form, and associating each of said elements with a two-letter abbreviation comprising an upper case alphabetic character followed by a lower case alphabetic character.

BRIEF DESCRIPTION OF THE DRAWINGS

Referring now to the drawings wherein like elements are numbered alike in the several FIGURES.

DETAILED DESCRIPTION OF THE PREFERRED EMBODIMENT

Figure 1:
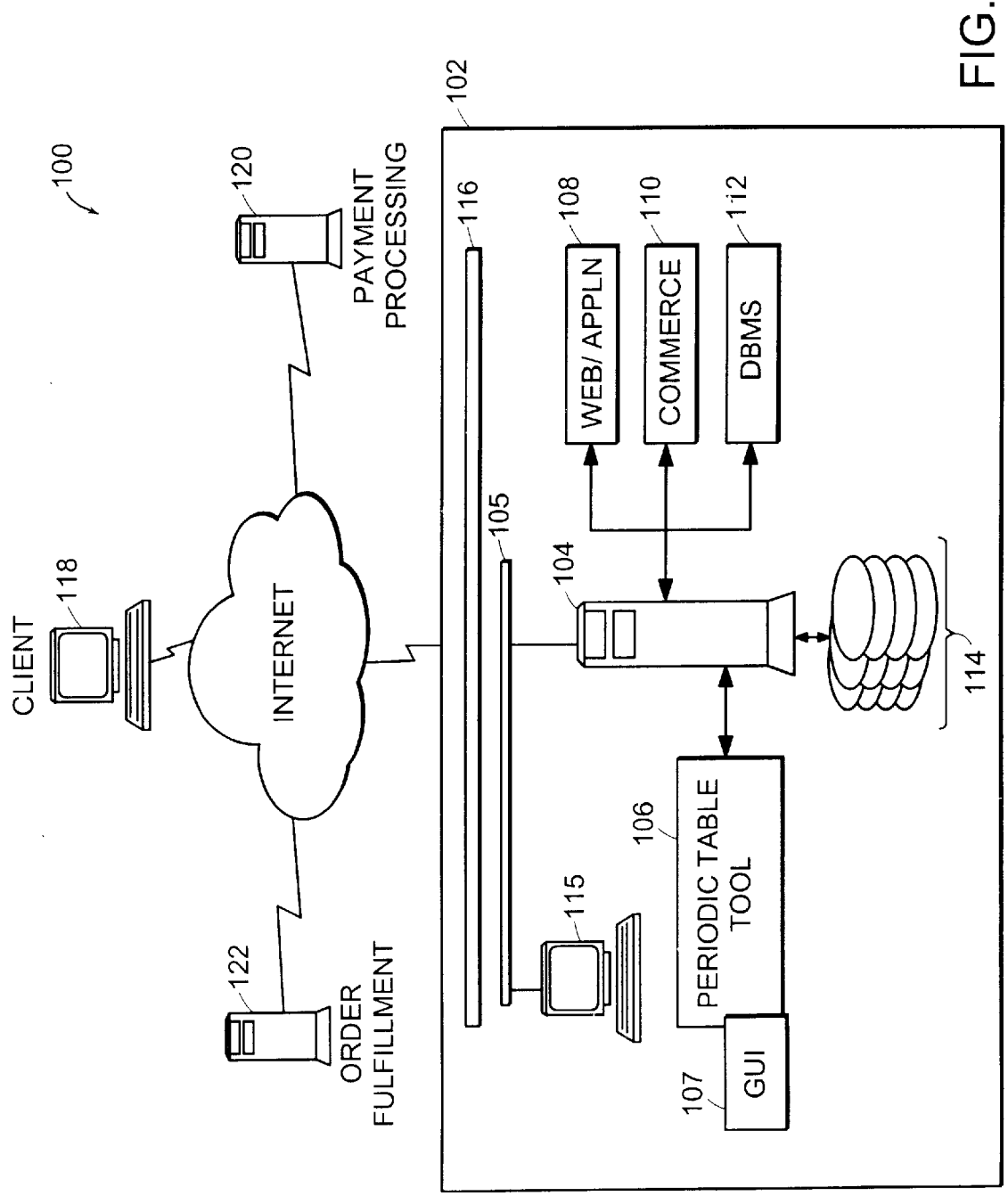
FIG. 1 is a block diagram of a system environment in which the periodic table navigation tool is implemented in an exemplary embodiment.

In an exemplary embodiment, the periodic table navigation tool is implemented via a computer-based network environment such as that shown in system 100 of FIG. 1. System 100 includes an enterprise system 102 which, for purposes of illustration, is also referred to herein as "Store, Inc.". Enterprise system 102 may be a chemical manufacturer, vendor, or distributor. Enterprise system 102 includes a server 104 running applications including web and applications server programs 108, one or more commerce tools 110, a database management tool 112, and security software 116. In addition to these tools and the periodic table navigation tool of the invention, other applications may be utilized by enterprise 102 as well, such as an enterprise resource planning suite. Web and applications server 108 receives and transmits web site pages and provides web services and access to application programs in response to requests for them. Commerce tool 110 performs various customer- and business-related functions such as product ordering, gathering and maintaining customer account information, providing customer registration services, product catalogue services, and general administration. Commerce tool 110 may be a proprietary tool of enterprise 102 or may be a commercially-acquired product. Database management tool 112 searches and retrieves information from databases 114, such as product or technical information, customer account statuses, or customer assistance (e.g., 'help' feature). Databases 114 house information relating to products, technical information, customer accounts, and any other information desired by enterprise 102. Server 104 also executes messaging software to allow communications (e.g., email) between enterprise system 102 and its customers and trading partners.

Server 104 also executes the periodic table navigation tool 106 of the invention. Periodic table navigation tool 106 (also referred to as 'periodic table tool') and periodic table navigation tool user interface 107 (referred to as 'user interface') provide easy access to information and services of enterprise 102 as described further herein. User interface 107 provides a user with a graphical display of available options and is conceptually patterned after Mendeleev's Periodic Table of the Elements in order to facilitate navigation for users who have some degree of knowledge of chemistry. The associative properties of user interface 107 to Mendeleev's Periodic Table of the Elements are illustrated further in FIG. 3 and will be readily apparent to those skilled in the art. The navigation system of interface 107 allows a user to navigate within periodic table navigation tool 106 using metaphorical representations of existing and fictitious elements. User interface 107 allows a user to access the objects of periodic table navigation tool 106 (i.e., to navigate within periodic table navigation tool 106). Periodic table tool 106 includes levels of navigation structured in a hierarchical form as described further in FIG. 2 and which range, in part, from the general to the specific. A hierarchical structure requires that a user return to a higher level before he/she can move laterally for selection of an object at that level. A user moves between and among these levels to navigate within periodic table navigation tool 106.

User interface 107 is based on a conceptual model that includes metaphoric representations via a periodic table of elements relating to information and services concerning chemical products providing a user or customer with an intuitive means to navigate within periodic table navigation tool 106. In this model, real and fictitious elements of a periodic table are displayed on the display device of client system 118 to provide a metaphor to a user of the services and products available. As a user navigates within periodic table navigation tool 106, a sub-listing of elements are presented on the display device of client system 118 including metaphorical associations to related products and services.

A workstation 115 is also included in system 100 for enabling system administration services to be performed and may comprise any suitable general purpose computer device known in the art. Server 104 is coupled to workstation 115 and databases 114 via a communications cable 105 or other suitable communications technology as is known in the art including wireless technology.

Server 104 communicates over the Internet to customers and other outside entities via a network connection provided by a dial in connection to an Internet service provider, an online service, or other suitable means. Server 104 also interfaces with order fulfillment center server 122 via the Internet or other network connection (e.g., Intranet, Extranet, etc.) for coordinating the supply and shipment of products purchased from enterprise 102 or its affiliates. The order fulfillment center may be a shipping warehouse or storage facility of enterprise 102 which receives purchase orders from enterprise 102 and is responsible for delivering goods. Server 104 may also interface with a payment processing center server 120 for facilitating the transfer of electronic funds between customers and enterprise 102 relating to products purchased also via the Internet or other network means. Payment processing server 120 may be a commercial tool that accesses banks and performs debit or credit services relating to purchases.

Shown generally in system 100 is a computer or client system 118 including a central processing unit coupled to memory, a display device, a communication device, and an input device. The memory includes random access, non-volatile memory such as read only memory or magnetic discs. The display device may be a liquid crystal display having adequate pixels for optimum viewing resolution. The input device may be a mouse, keyboard, or other suitable input means. The memory of client system 118 stores system software which controls the operation of system. Software includes a web browser program for accessing web pages on a web site and an email program for communicating with enterprise system 102. Client system 118 also includes a device for connecting with the Internet such as a modem and an Internet service provider subscription or other suitable means for accessing the Internet. Client system 118 may be an existing or potential customer of enterprise system 102.

Figure 2:
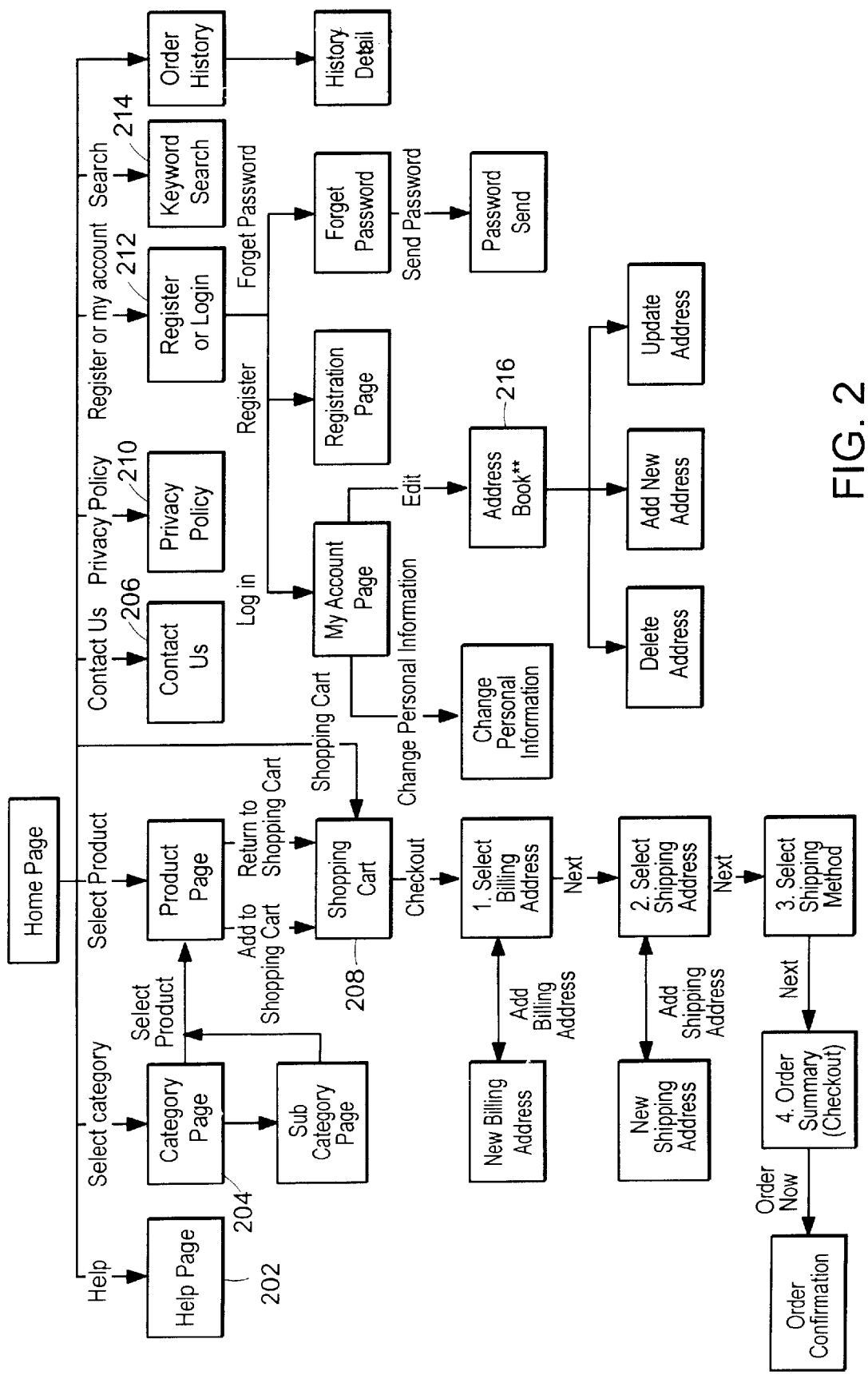
FIG. 2 is a structural layout of the arrangements of information and connections between web pages and tools implemented by the periodic navigation tool.
Figure 3:
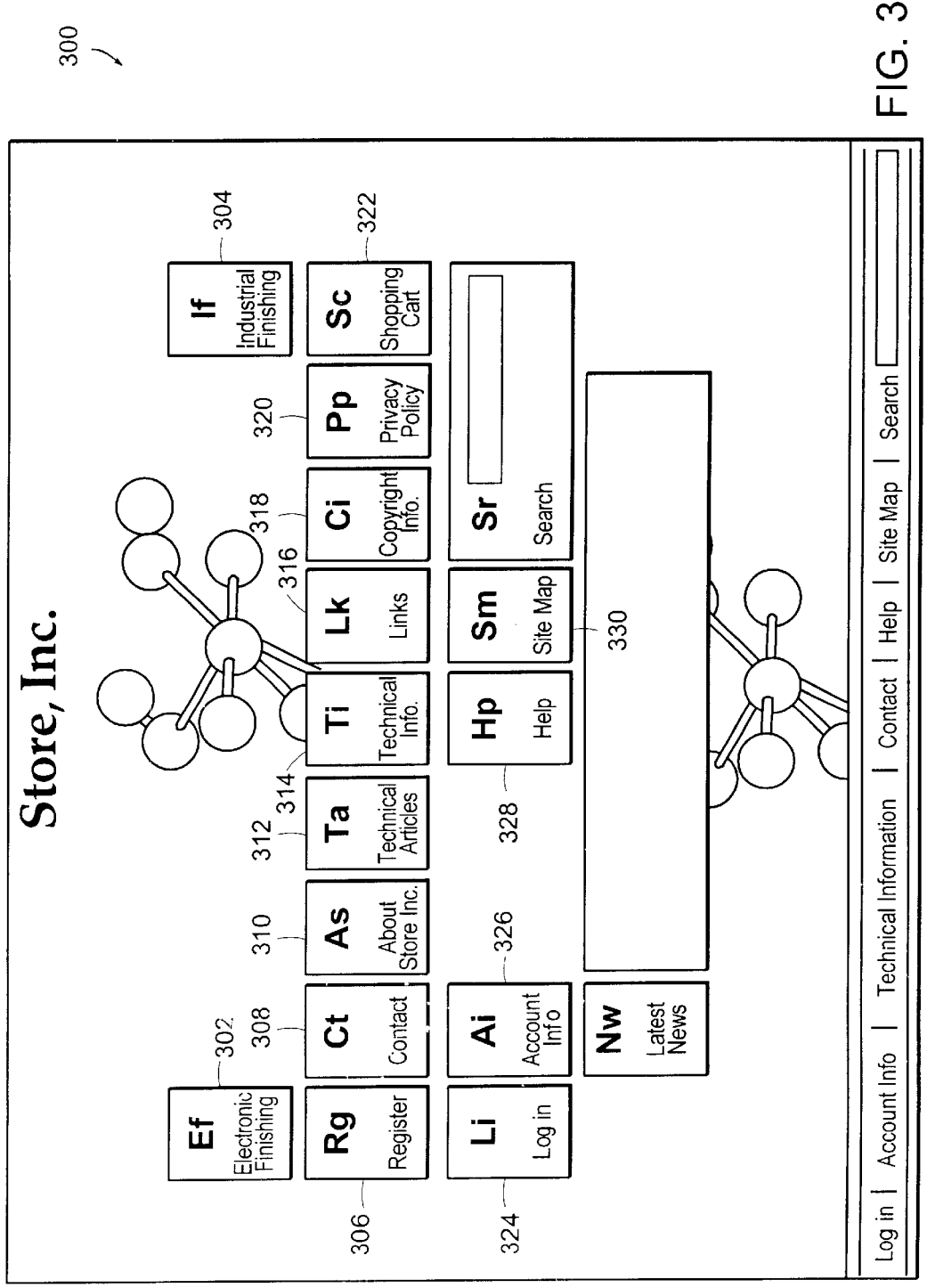
FIG. 3 is an exemplary user interface main menu screen for accessing the features and services provided by the periodic table navigation tool.

Referring to FIG. 2, a hierarchical navigation structure describing the features and functions of periodic table tool 106 is presented. Once a user of client system 118 accesses the web site for enterprise 102 via a browser program, the periodic table user interface 107 main menu screen 300 of FIG. 3 is presented for the user. From user interface screen 300, a user can select from various options. A 'help' page 202, 'category' page 204, 'contact us' page 206, 'shopping cart' page 208, 'privacy policy' page 210, 'register/log in' page 212, and 'keyword search' page 214 are options that may be available for selection by a user of client system 118 from interface screen 300. Other features provided as generally shown in FIG. 2 are available for selection by a user via the above listed options 202–214. Address book option 216 allows shipping addresses to be stored in one or more of databases 114 and retrieved for future transactions. Products offered by enterprise system 102 can be searched by product category or via a direct product search as described further in FIG. 4. Once a product is selected for purchase, the functions provided by commerce tool 110 include gathering customer information and facilitating the processing of the customer order. Also via the commerce tool 110, a user can register with enterprise system 102 thereby establishing an account for existing and future transactions as well as receiving special services or account member privileges.

The customer selects a password during registration to be used to identify and safely process customer queries. The periodic table navigation tool 106 may be configured to offer different services customized for the particular user accessing the tool. For example, a customer who has registered with the tool has indicated during the registration process that it is a large business. Enterprise system 102 may wish to provide discounted product offerings for bulk purchases as an incentive to increase its sales and promote retention of this customer. The tool may also be configured to provide customized product offerings for this purpose. Based upon this customer's history of purchases, the tool may be configured to market select product offerings based on this information as well.

Referring to FIG. 3, a periodic table navigation tool user interface screen 300 (also referred to as 'main menu' and 'home page') of user interface 107 is shown. Particular metaphoric representations of Mendeleev's Period Table of Elements used by user interface 107 include two-letter abbreviations for functions available via navigation tool 106. These abbreviated items each contain an upper case and lower case alphabetic character. Further, each item is encapsulated within a rectangle and displayed in a tabular form similar to the table of elements. The items are further grouped and positioned asymmetrically within the table whereby blank spaces are provided between some of the items. This is similar to Mendeleev's Periodic Table of the Elements in that elements in the table include blank spaces resulting in an asymmetrical form due to undiscovered or unknown elements reflected by the blank spaces. Elements in Mendeleev's table are grouped according to their properties and relationships amongst each other. The use of a simulated periodic table of elements as a user interface may be useful to enterprise system 102 because it provides an intuitive navigation guide for its customers who are likely to be well versed in chemicals and the periodic table of elements, thereby not only distinguishing enterprise 102 from its competitors, but also promoting familiarization and association, thereby increasing the likelihood of continued business relationships.

User interface screen 300 is the default navigation location of periodic table tool 106 upon a user's initial access to periodic table tool 106. User interface screen 300 includes two product categories: 'electronic finishing' 302 and 'industrial finishing' 304 which are shown for illustrative purposes. Periodic table navigation tool 106 is extensible in that additional product categories can be configured into the tool and associated with an object or metaphoric periodic table element on screen 300. As described in FIG. 2, menu screen 300 includes available options for a user to select as desired. Each function provided by the tool may be associated with an object represented metaphorically as one of the various elements of the periodic table of elements which are generally known in the science community and those skilled in the art and/or may be associated with an object represented metaphorically as a fictitious element. Metaphors used by the tool include the following items.

Figure 4:
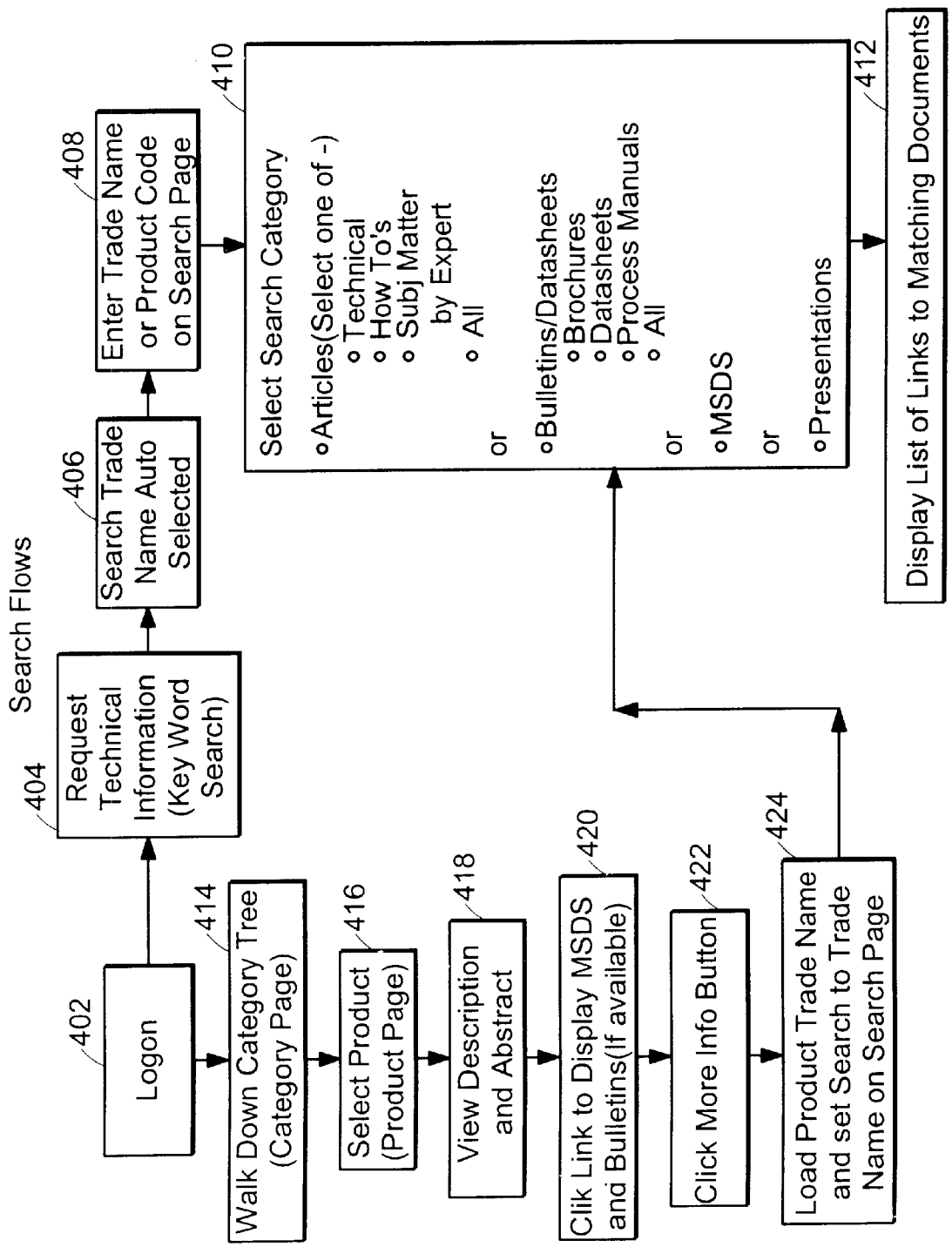
FIG. 4 is a flowchart illustrating the flow of information for allowing navigation to product and technical information.

- Rg 306 Refers to account registration services which allows a user to provide personal information and set up a customer account
- Ct 308 Refers to a contact feature which allows a user to email the enterprise implementing the tool
- As 310 About 'Store, Inc.' refers to a company profile page for the enterprise implementing the tool
- Ta 312 Refers to a technical articles resource database feature whereby a user can access an archives database for information
- Ti 314 Refers to technical information in a resource database relating to products and services offered by the enterprise implementing the tool
- Lk 316 Refers to hypertexted links to resource materials and assistance
- Ci 318 Refers to copyright information and protected property of the tool
- Pp 320 privacy policy refers to required federal law disclosures relating to the protection of individuals rights to privacy
- Sc 322 Refers to a shopping cart feature for ordering products
- Li 324 Refers to a log-in routine for registered customers/users
- Ai 326 Refers to a function for obtaining information relating to a specific customer account
- Hp 328 Refers to a help feature for assisting a user in finding specific information and assistance how navigating through the tool
- Sm 330 Refers to a directory of services (e.g., site map) and information available via the periodic table navigation tool
- Sr 332 Refers to a search engine feature
- Nw 334 Refers to a database of current product and industry related news events and articles As indicated above, the periodic table navigation tool 106 allows a registered user to search for product and technical information stored in databases 114. The search flowchart shown in FIG. 4 illustrates this further. A user logs on to the tool at step 402 and is presented with two search options. The first is a 'Request Technical Information' option whereby a user can utilize a key word search engine at step 404. The user may also search by trade name at step 406 by entering the desired name and/or product code at step 408. Various categories of technical information are presented to the user. The user selects from this list of choices at step 410. Search categories include articles, bulletins, material safety data sheets (MSDSs), and presentations which may be further defined by sub-categories as shown in FIG. 4. Once a category and subcategory are selected, the tool displays a list of links to documents relating to the selection at step 412.

Figure 5:
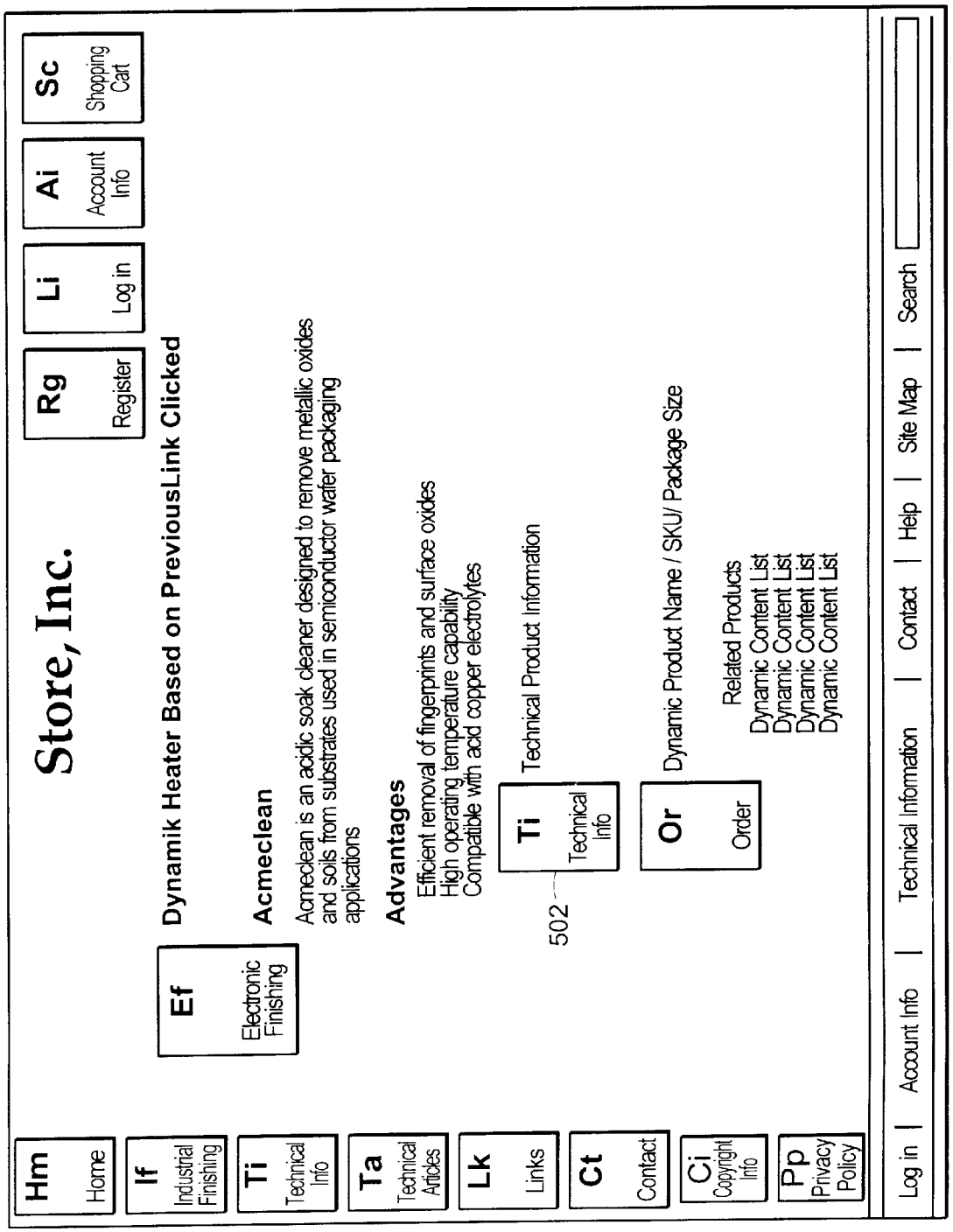
FIG. 5 is a computer screen window illustrating a content web page provided by the periodic table navigation tool as seen by a user.

Alternatively, a user may choose to search by product category by selecting this option whereby a product category page is presented listing all available product categories at step 414. The user then selects a desired product category whereby a listing of all products relating to that product category are then presented at step 416. Sample product categories are shown in FIG. 3 for illustrative purposes, namely, electronic finishing 302 and industrial finishing 304. The user may then view a description of the product as well as an abstract at step 418. A sample product page is shown in FIG. 5. Also presented with the product description and abstract are links to additional available information such as MSDSs and bulletins at step 420. The user may select "Ti" 502 at step 422 to receive this information. If the user chooses to select this option, the tool loads the products trade name and sets a search to trade name within a search page at step 424. This step then brings the user to the search category page of step 410 whereby the user may select from available categories of information and link to the resources as described in steps 410 and 412.

Graphical user interfaces assist in facilitating human interaction with computer systems. The present invention utilizes metaphors as a way of maximizing human familiarity and conveying information between the user and the computer. Through the use of chemical related metaphors, the tool takes advantage of existing human mental structures by drawing upon the metaphor analogy to lead to an understanding of the requirements of the underlying computer system.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A system for facilitating viewer navigation through online information, comprising:
    at least one database;
    a server in communication with said at least one database;
    a link to an order fulfillment system;
    a link to a payment processing system; and
    a link to a client system;
    wherein said system is executing software including:
        a web server application;
        an application server tool;
        a commerce tool for ordering one or more chemical products;
        a database management tool;
        a security tool; and
        a navigation tool including a user interface, said user interface displaying objects relating to said chemical products in a form of a periodic table, wherein each of said objects is linked to information or services concerning said chemical products and each said object is represented as an abbreviation of a function provided by said navigation tool.

2. The system of claim 1, wherein said at least one database stores product related information including:
    technical data;
    flows article;
    material safety data sheets;
    graphical presentations;
    product abstracts;
    product availability;
    product usages;
    product prices; and
    product bulletins.

3. The system of claim 2, wherein said at least one database stores customer information;
    name and business address;
    contact information;
    account status;
    shipping information;
    account history; and
    payment data.

4. The system of claim 2, wherein said at least one database stores product catalogs, including:
    product trade name;
    product code; and
    unit of sale.

5. The system of claim 1, wherein said commerce tool provides business and transaction services including:
    customer registration;
    product purchasing;
    payment processing; and
    account updating.

6. The system of claim 1, wherein said database management tool includes a search engine.

7. The system of claim 1, wherein said navigation tool includes a hierarchical navigation structure with levels of access linking said objects within said hierarchical navigation structure.

8. The system of claim 1, wherein said order fulfillment system is a warehouse associated with a vendor of said chemical products.

9. The system of claim 1, wherein said order fulfillment system is a supplier associated with a vendor of said chemical products.

10. The system of claim 1, wherein said payment processing system is a financial institution.

11. A method for navigation within a graphical user interface of a computer system over a network, comprising:
    providing objects relating to information services concerning one or more chemical products in a form of a periodic table on a display device of said computer system, wherein each said object is represented as an abbreviation of a function provided by a navigation tool;
    linking each of said elements objects to an item stored in a storage;
    upon selecting one or said objects, performing said corresponding function including retrieving said item from said storage; and
    presenting said item on said display device.

12. The method of claim 11, wherein providing objects includes:
    arranging each of said objects in an asymmetric tabular form; and
    each said abbreviation includes a two-letter abbreviation comprising an upper case alphabetic character followed by a lower case alphabetic character.

13. The method of claim 11, wherein said item is a text file.

14. The method of claim 11, wherein said item is a software application.

15. The method of claim 11, wherein said item is a database.

16. A storage medium encoded with machine-readable computer program code for navigating within a graphical user interface of a computer system over a network, the storage medium including instructions for causing said computer to implement a method comprising:

providing objects relating to information or services concerning one or more chemical products in a form of a periodic table on a display device of said computer system, wherein each said object is represented as an abbreviation of a function provided be a navigation tool;

linking each of said elements objects to an item stored in a storage;

upon selecting one of said objects, performing said corresponding function including retrieving said item from said storage; and presenting said item on said display device.

17. The storage medium of claim 16, wherein providing objects includes:

arranging each of said elements objects in an asymmetric tabular form; and each said abbreviation includes a two-letter abbreviation comprising an upper case alphabetic character followed by a lower case alphabetic character.

18. The storage medium of claim 16, wherein said item is a text file.

19. The storage medium of claim 16, wherein said item is a software application.

20. The storage medium of claim 16, wherein said item is a database.

\* \* \* \* \*